Oct. 3, 1944.   B. H. LOCKE   2,359,526
VARIABLE SPEED TRANSMISSION
Filed Oct. 27, 1943   2 Sheets-Sheet 1

INVENTOR
Burton H. Locke

Patented Oct. 3, 1944

2,359,526

UNITED STATES PATENT OFFICE 2,359,526

VARIABLE SPEED TRANSMISSION

Burton H. Locke, Framingham, Mass.

Application October 27, 1943, Serial No. 507,795

6 Claims. (Cl. 74—286)

My present invention relates to improvements in variable speed transmissions of the form shown and described in my previous Patent No. 2,259,823, patented Oct. 21, 1941, and is prompted by discoveries made by recent experiments with an actual transmission involving the said patent, wherein the following conditions have been observed:

Commercial worm gearing having two or more threads is reversible. That is, pressure applied to the worm gear will cause rotation of the worm.

A single threaded worm and gear is not reversible and thus requires power to be applied to the worm to drive the reverse motion. Therefore, efficiency of transmissions employing single thread worm gearing would be greatly reduced due to the power required to drive the reversing motion.

The friction in the threads of a worm and gear is 2 to 3 times greater when the gearing is at rest than when rotating at normal speed. Furthermore, the friction in the threads decreases as the rotation of the worm increases.

Normal torque loads on commercial worm gears of two or more threads may cause reversibility from rest, while under light torque loads the same gear will remain self-locking.

V-belt drives such as employed by applicant to control the reversing worm gearing, even in relatively light construction, will operate satisfactory under fluctuating loads, such as would be necessary to meet, in controlling recessions that are continually subjected to varying torque loads during the operation of the transmission. Also, and most importantly, a V-belt drive is capable of meeting the load range that would be imposed on same intermediate a recession at rest and one operating to effect minimum output speed, although the load would vary 2 to 3 or 4 to 1, due to friction differential, as cited above.

It would be obvious to those familiar with the art of friction disc drives, that the said drives would not operate under such fluctuating loads, without slippage, especially in transmissions of heavy capacities.

One object of this invention, in addition to the objectives set forth in my previous Patent No. 2,259,823, is to produce transmissions wherein the worm geared recession is definitely of a reversible construction so that no power is consumed to operate same. This is accomplished by always employing a worm and gear having a plurality of threads, as cited above.

A further object is to permit to elect, when practical, means to afford a balancing effect to the recession to a degree that taxes substantially the capacity of the V-belt drive to control the said recession in order to utilize said drive to revert power back to the drive shaft, thereby increasing the efficiency of the transmission.

A still further object is to permit a broader range of balance than specified in my said previous patent in order that commercial worm gear threads can be utilized, when practical, thereby affording a simpler and less expensive construction.

Figure 1:
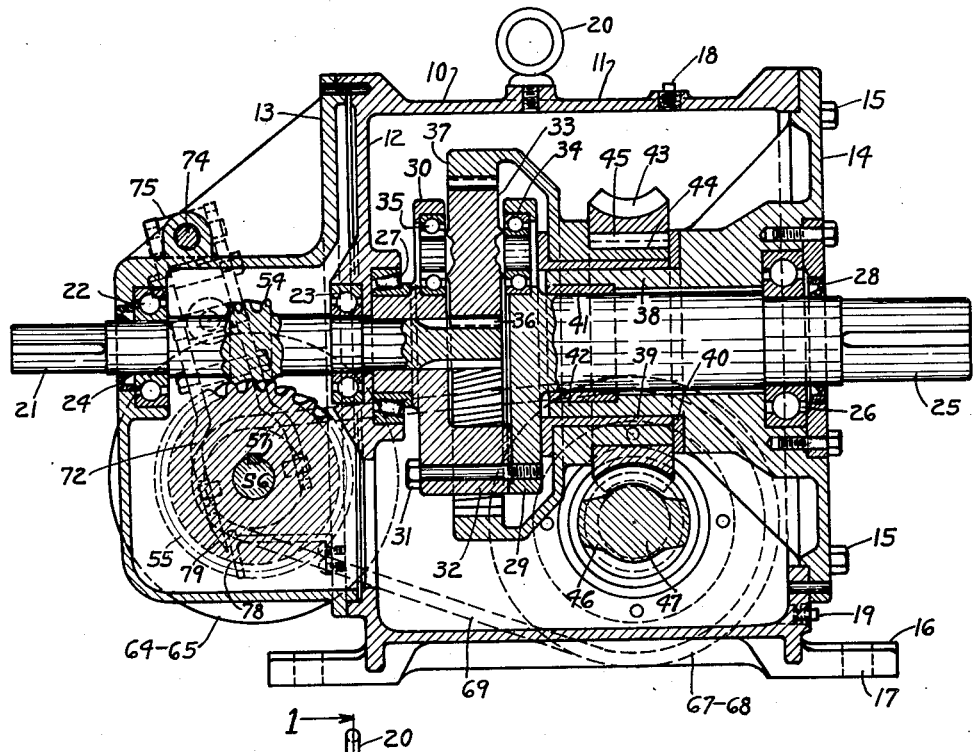
Figure 1 is a sectional side elevation of my improved variable speed transmission taken at 1—1 on Figure 2, or Figure 3.
Figure 2:
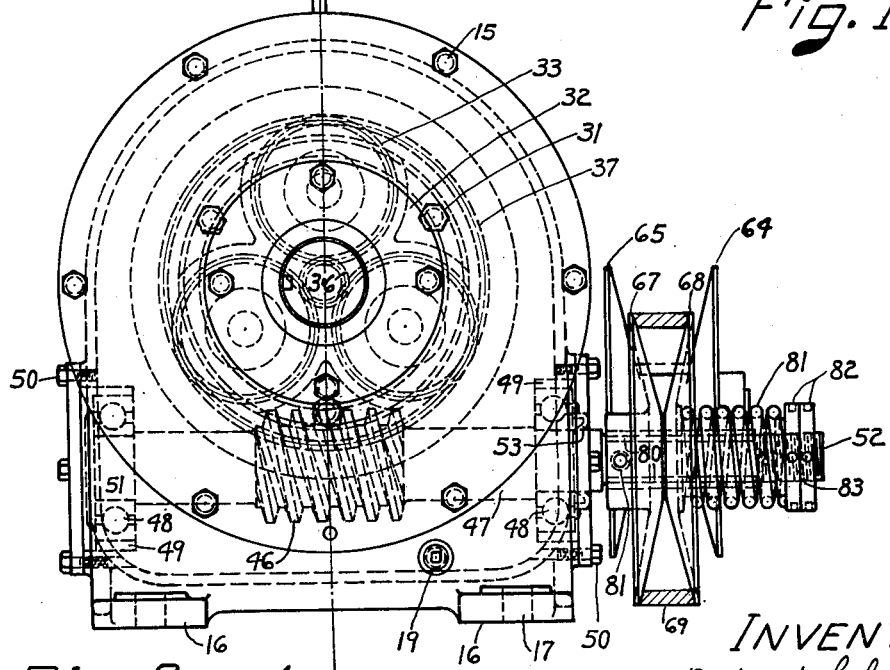
Figure 2 is an end elevation of same taken at the end of the driven shaft to show the worm gear balancing means.
Figure 3:
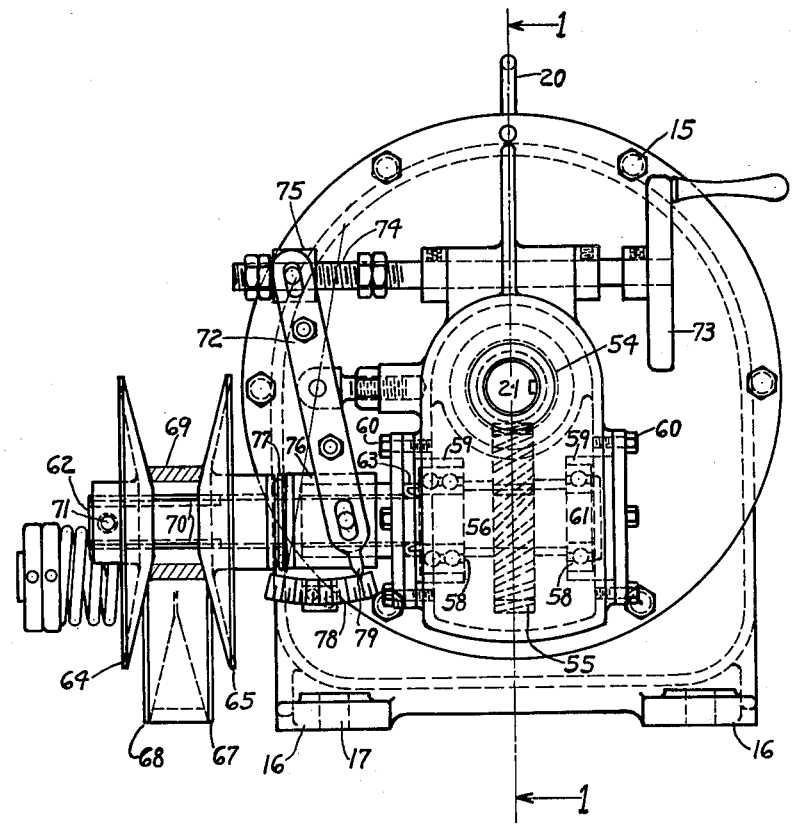
Figure 3 is an end elevation of same taken at the end of the drive shaft to show the V-belt controlling means.

My improved variable speed transmission comprises a casing 10, constructed of a center section 11 having an integral bearing supporting head 12, and end flanges 13 and 14 fastened at opposite ends thereof by means of cap screws 15. Center section 11 has suitable feet 16, at the bottom portion thereof, with bolt holes 17 to be utilized in mounting the transmission to a base or other anchorage. The casing is generally partially filled with oil to lubricate the interior gearing and bearings, which is common practice in the art, and plugs 18 and 19 are provided for purpose of adding and draining the oil, respectively. A lifting eye 20 is provided on the casing for convenience in hoisting the transmission into operating position as required. A drive shaft 21, generally rotating at high speed, is journaled in bearing 22 supported in end flange 13, of casing 10, and in bearing 23 supported in head 12, of center section 11, and an oil seal 24 is provided to prevent oil escaping from the casing. A driven shaft 25 is journaled in bearing 26 supported in end flange 14, and in bearing 27 supported in head 12, of center section 11, and an oil seal 28 is provided to prevent oil escaping from the casing. The inner end of driven shaft 25 is composed of an integral flange 29 and a similar flange 30 bolted thereto by means of bolts 31. Flange 30 is positioned in spaced relation to flange 29 by a plurality of bosses 32 integral with flange 30, and there are a plurality of planet gears 33 rotatively mounted therebetween in bearings 34 and 35 supported in flanges 29 and 30, respectively. Planet gears 33 are positioned at equal circumferential spacings around a sun gear 36 formed on the inner end of drive shaft 21 and mesh therewith and also mesh with an internal gear 37. Internal gear 37 is rotatively mounted on a sleeve 38 which is an integral part of end flange 14, of casing 10. Bearing bushing 39 and thrust collar 40 are provided for the internal gear 37 and also a bearing bushing 41 is provided between sleeve 38 and driven shaft 25, when required, to assist in supporting the inner end 42 of sleeve 38 to withstand the relative heavy overhanging weight of the internal gear assembly, especially in transmissions of heavy capacities. A worm gear 43 is mounted on the hub 44, of internal gear 37, by key 45 and meshes with a worm 46 formed integral with a shaft 47. Shaft 47 is journaled in bearings 48 supported in sleeves 49 which are secured in center section 11, of casing 10, by means of cap screws 50. Shaft 47 is generally mounted perpendicular to the axis of worm gear 43 to position worm 46 most effectively to cooperate in checking the rotation of said worm gear to accomplish an objective hereinafter described. One end 51, of shaft 47, terminates within its supporting sleeve 49 and the other end 52 extends outside of casing 10 for the purpose of receiving variable speed mechanism hereinafter described and oil seal 53 is provided. A spiral gear 54 is formed integral with drive shaft 21, generally intermediate bearings 22 and 23, and meshes with a spiral gear 55 secured on a shaft 56 by key 57. Shaft 56 is journaled in bearings 58 supported in sleeves 59 which are secured in end flange 13, of casing 10, by means of cap screws 60. Shaft 56 is generally mounted parallel to shaft 47 to facilitate the two shafts being connected by a common variable speed mechanism to be described. One end 61, of shaft 56, terminates within its supporting sleeve 59 and the other end 62 extends outside of casing 10 for the purpose of receiving variable speed mechanism hereinafter described and oil seal 63 is provided.

A pair of cone pulleys 64 and 65 are mounted at the outer end 62, of shaft 56, and a similar pair of pulleys 67 and 68 are mounted at the outer end 52, of shaft 47, for the purpose of cooperating with a common V-belt 69. Cone pulley 64 is secured to shaft 56 by means of keys 70 and set screw 71, and pulley 65 is mounted to rotate with shaft 56 by means of keys 70, but is free to move laterally on said shaft for the purpose of shifting the position of V-belt 69 intermediate the said pulleys. The lateral movement of pulley 65 is accomplished by means of shifter lever 72 which is controlled by hand wheel 73 through medium of screw 74 and nut 75, shifter spool 76 and ball thrust bearing 77, all of which are within the knowledge of the mechanic and thus should require no further explanation. An indicator 78 and pointer 79 are provided to facilitate minute speed adjustment.

Cone pulley 67 is secured to shaft 47 by means of keys 80 and set screw 81, and pulley 68 is mounted to rotate with shaft 47 by means of keys 80, but is free to move laterally on said shaft for the purpose of shifting the position of V-belt 69 intermediate the said pulleys. Pulley 68 is held in resilient contact with V-belt 69 by means of compression spring 81, which obviously will retain proper operating tension on the said belt at all times as pulleys 64 and 65 are adjusted. It is obvious that pulleys 67 and 68 will be brought nearer together by spring 81 whenever V-belt 69 is released by pulleys 64 and 65 being shifted apart. Conversely, whenever pulleys 64 and 65 are adjusted toward each other tension will be set up in the V-belt which would force pulleys 67 and 68 apart against the action of spring 81. Spring 81 is held against pulley 68 by adjusting nuts 82 which have threaded engagement 83 with shaft 47, and spring 81 can be adjusted to proper operating condition by means of said nuts. Therefore, the speed of shaft 47 and, resultingly, the speed of driven shaft 25 can be readily changed by manipulation of handwheel 73 as this would effect a change in the relative operating position of the V-belt 69 on the cone pulleys, thereby effecting changes in the effective diameters of said pulleys.

Those skilled in the art of transmissions are aware that if the driving shaft of a planetary transmission, such as shaft 21 of the transmission shown, is rotated, the planet gears 33 will rotate and will transmit rotation to the internal gear 37. It is also well known that by holding the internal gear while the driving shaft is rotated, the planet gears will travel around the sun gear 36 and will thus cause rotation of the driven shaft 25 in the direction of the drive shaft 21. Also it is well known that if the internal gear is driven or permitted to rotate at various speeds the rotation of driven shaft 25 will be effected accordingly, and also the driven rotation of the internal gear could be such as to cause the driven shaft to be rotated in the reverse direction to the drive shaft. Therefore, it is obvious that the rotation of the driven shaft 25 of the transmission shown can be minutely adjusted from the maximum permitted speed in the direction of the rotation of the driving shaft 21 down to zero and up to its maximum permitted speed in the reverse direction by manipulation of handwheel 73.

Further, it is well known to those skilled in the art of transmissions that when large reductions in speed are required a plurality of reduction gear sets are utilized in alignment and in such transmissions the driven member of the first set is the driving member of the second set, and so on, with the driven member of the last set transmitting the final motion. Therefore, it is obvious that one or more sets of reduction gears, of the planetary form or of other conventional form, could be utilized proceeding my variable speed transmission in an extended casing where reductions in speed were required, without departing from the spirit of the invention.

In operation it is essential that worm gear 43 be permitted to rotate in the direction of the torque imposed on same by the operation of the transmission, therefore, the hand of threads on worm 46 and worm gear 43 should be constructed in cooperation with the hand of teeth on spiral gears 54 and 55 to permit such a rotation. Worm 46 is made with a plurality of threads to afford proper angle, or lead, to the threads for the purpose of permitting worm gear 43 to rotate worm 46 whenever said gear is subjected to a pressure resulting by the transmission being operated under a load. Under this condition it is obvious that no power other than the reacting pressure on the worm gear is required to cause recession, with the result that the transmission would be of higher efficiency than if the worm and gear were of the so-called self-locking type, which are constructed with a single thread, and wherein it is necessary to drive the worm in order to permit the worm gear to rotate.

Also, as the speed of the worm gear is permitted to increase, due to the transmission being adjusted toward its minimum output speed, the coefficient of friction of the threads decreases which causes proportionate increased pull to be imposed on the V-belt to control the recession. This increased pull, or power, is transmitted back through the spiral gears 55 and 54 to the drive shaft 21, thereby assisting to increase the efficiency of the transmission. Therefore, it is obvious that the output torque of the transmission will increase as the speed of the driven shaft 25 decreases resulting in higher torque output at lower output speeds, which would afford higher efficiency than would be afforded by an irreversible worm and gear.

In order to obtain the highest possible efficiency from the transmission the thread angle should be such as to cause the worm to impose a pull on the V-belt equal to the capacity of said belt when the transmission is operating at its minimum output speed, which is the point where maximum pull would be imposed on the V-belt. The full capacity of the V-belt would then be utilized to transmit power back to the drive shaft. However, it is deemed difficult to construct a worm gear drive that would always meet this exact condition, especially in various capacities, as would be required in the field, and also it is desirable in many instances, where practical, to utilize commercial form of worm gear threads for reason of simplicity and low cost of construction. Therefore, I conceive to limit the thread angle only to the degree that will permit recession under operating pressure, but will not permit said pressure to react on the V-belt beyond the capacity of the said belt at the minimum output speed. As cited hereinbefore, experiments show that the worm gearing must have two or more threads to meet such requirement.

Furthermore, it has become apparent from said experiments that a helix angle above 6 degrees will permit recession under normal operating pressures. However, the exact helix angle above 6 degrees to be employed in each transmission would be predetermined in accordance with the V-belt capacity and the operating conditions to be met thereby. Therefore, helix angles to meet the efficiency objective set forth in this application would lie between 6 degrees and 45 degrees which is generally considered the maximum angle in worm gearing.

Therefore, to successfully accomplish my objectives it is essential to combine a worm and gear having a plurality of threads, which would be reversible, to substantially effect a balance to the recession within permitted limitation, with a V-belt drive which will withstand fluctuating loads, as set forth, to control same. To applicant's knowledge there has been no suggestion of combining two such elements to accomplish these objectives in any reference cited in the process of prosecution of my previous Patent No. 2,259,823.

As cited above, the point where maximum pull is imposed on the V-belt drive would be when the worm 46 is rotating at its maximum speed and at this point the V-pulleys 67 and 68 would be necessarily forced apart to maximum spread to utilize the minimum effective diameter of same. At this position spring 81 would be at maximum compressed position and, resulting, maximum spring pressure would be afforded to impose frictional contact between the said pulleys and V-belt 69. It is obvious that compression of spring 81 would be proportionate to the speed of the worm and the effectiveness thereof would thus be in direct proportion to its required duty. Therefore, the arrangement of pulleys as employed by applicant would appear to be the best adaptation to the present invention. However, I do not wish to confine my invention to the exact arrangement, only to the extent as set forth in the claims to follow, as it is obviously possible, where practical, to employ other forms of adjustable V-belt drives. For example, the pulley arrangement could be reversed and operate to a degree of success; also, means other than nuts 82 could be employed to bring spring 81 into proper resilient contact with V-pulley 68.

It is obvious that other forms of planetary gearing, and also forms of so-called differential gearing, that have three main parts or portions could be harnessed in the manner set forth by applicant to achieve similar results. Also other conventional forms of variable speed drive could be utilized in place of that shown. However, for reason of brevity, applicant has only shown one form of equipment, this being the most successful form of equipment in present day use. Therefore, I do not wish to be confined to the exact details shown as same are susceptible of modification without departing from the spirit or scope of the invention which is broadly set forth in the following claims.

I claim as my invention:

1. A variable speed transmission comprising a casing, a drive and driven shaft, and gearing intermediate said shafts, said gearing comprising three main parts or portions, one portion being integral to said drive shaft, another portion being integral to said driven shaft, and the third portion being rotatively mounted to recede to effect changes in speed intermediate the drive and driven shafts, and means to control the recession of said third portion from said drive shaft comprising two parts, one of said parts being a balancing means comprising a worm gear integral with the recession member, and a worm mounted to cooperate therewith, said gear and worm having a plurality of threads with helix angle within the range of 6 degrees to 45 degrees to permit recession of the said third portion when subjected to operating pressure, the other of said parts being a controlling means comprising an adjustable V-belt drive operated from the said drive shaft to control the rotation of said worm, for the purpose of controlling the said recession.

2. A variable speed transmission comprising a casing, a drive and driven member, and gearing intermediate said members, said gearing comprising three main parts or portions, one portion being integral to said drive member, another portion being integral to said driven member, and the third portion being rotatively mounted to recede to effect changes in speed intermediate the drive and driven members, and means to control the recession of said third portion from said drive member comprising two parts, one of said parts being a balancing means comprising a worm gear integral with the recession member, and a worm mounted to cooperate therewith, said gear and worm having a plurality of threads with helix angle within the range of 6 degrees to 45 degrees to permit recession of the said third portion when subjected to operating pressure, the other of said parts being a controlling means comprising an adjustable V-belt drive operated from the said drive member to control the rotation of said worm, for the purpose of controlling the said recession.

3. In variable speed transmission as described in claim 1, the said adjustable V-belt drive comprising a pair of adjustable pulleys having positive adjusting means, rotated by said drive shaft, and a pair of adjustable pulleys having adjustable resilient actuation, mounted on the worm shaft, and a V-belt operatively connecting both pair of said pulleys.

4. In variable speed transmission as described in claim 2, the said adjustable V-belt drive comprising a pair of adjustable pulleys having positive adjusting means, rotated by said drive member, and a pair of adjustable pulleys having adjustable resilient actuation, mounted on the worm shaft, and a V-belt operatively connecting both pair of said pulleys.

5. In variable speed transmission as described in claim 1, the said adjustable V-belt drive comprising a pair of adjustable pulleys having adjustable resilient actuation, rotated by said drive shaft, and a pair of adjustable pulleys having positive adjusting means, mounted on the worm shaft, and a V-belt operatively connecting both pair of said pulleys.

6. In variable speed transmission as described in claim 2, the said adjustable V-belt drive comprising a pair of adjustable pulleys having adjustable resilient actuation, rotated by said drive member, and a pair of adjustable pulleys having positive adjusting means, mounted on the worm shaft, and a V-belt operatively connecting both pair of said pulleys.

BURTON H. LOCKE.